United States Patent [19]

Yeh

[11] Patent Number: 5,031,851

[45] Date of Patent: Jul. 16, 1991

[54] DRIVING DEVICE FOR VIDEO CASSETTE REWINDER

[76] Inventor: Tsun N. Yeh, No. 214-1 Nan Da Road, Hsinchu, Taiwan

[21] Appl. No.: 489,266

[22] Filed: Mar. 6, 1990

[51] Int. Cl.⁵ .................... B65H 18/14; G11B 15/48
[52] U.S. Cl. ............................ 242/67.1 R; 360/74.2
[58] Field of Search ............... 242/186, 198, 200, 201, 242/67.1 R; 360/74.1, 74.2, 74.3

[56] References Cited

U.S. PATENT DOCUMENTS

| | | | |
|---|---|---|---|
| 3,759,463 | 9/1973 | Yoshii | 242/186 |
| 4,522,353 | 6/1985 | Yeh | 242/198 |
| 4,848,699 | 7/1989 | Jing-Lin | 242/201 |
| 4,919,357 | 4/1990 | Lin | 242/200 X |

Primary Examiner—Daniel P. Stodola
Assistant Examiner—William G. Battista, Jr.
Attorney, Agent, or Firm—Ladas & Parry

[57] ABSTRACT

An improved video cassette rewinder which comprises a base, a receptacle, a driving device, and a receptacle opening device, etc. The driving device comprises a single belt pulley provided beneath a rewinding shaft and above a receptacle opening device and a camming device. The belt pulley is provided with a plurality of protrusion on the periphery thereof. The rewinding shaft will not be rotated when the rewinding of the video tape is ended due to the fact that the rewinding shaft is engaged with the reel of the video tape, and the belt pulley will be moved downward by the camming device, and one of the protrusions will push the receptacle opening device to move laterally and to be opened. The shifting device comprises four ratchet teeth equidistantly spaced provided at the outer peripheral edge of the bottom of the rewinding shaft, an orientation sleeve engaged with the belt pulley and provided with four guide slots for snap engagement of four ratchet teeth, and a compression spring disposed on the bottom of the belt pulley for biasing the belt pulley to its original position after the belt pulley has been moved downward by the camming device.

2 Claims, 3 Drawing Sheets

DRIVING DEVICE FOR VIDEO CASSETTE REWINDER

BACKGROUND OF THE INVENTION

Field of the Invention

The present invention relates to an improved video cassette rewinder, and more particularly to an improved driving mechanism for a video cassete rewinder, which has a simple construction and can accurately effect opening of the receptacle.

Generally, the video cassete rewinder is designed for rewinding the video tape and automatically opening the receptacle for video cassette, hence its driving mechanism and receptacle opening device are of the main point of the design of the video cassette rewinder. In the conventioanl rewinder, the driving mechanism generally uses the opening belt and pulley assembly to effect driving while the receptacle opening device uses the fly wheel driven by said belt and pulley assembly and a link to indirectly accomplish the purpose of opening of the receptacle for the video cassette. Although, such a design can achieve the purpose of rewinding of the video tape and opening of the receptacle, there still exists several potential drawbacks according to the statistics of the practical use; namely:

(1) Inaccurate automatic opening of the receptacle: since the opening of the prior known receptacle for video cassette is achieved by means of driving fly wheel by the belt in order to enable the link to lift the cassette, and whether the opening of the receptacle is accurate depends on the tension of the belt. The purpose of the provision of the belt is not only to drive, but also to maintain a proper tension. However, the belt will become loose after it has been used for a certain period of time since the belt used in the video cassette rewinder is relatively thin. This will result in the loss of tension of the belt, so that the opening of the receptacle will not be effected concurrently with the ending of the rewinding of the video tape, and also will result in an inaccurate opening of the receptacle, and even an idling of the motor which will cause a fire alarm after using for a certain period of time.

(2) It comprises too many members, which will result in high production costs and assembly difficulty. The mechanism of receptacle driving and opening of the prior art rewinder is comprised of the belt and pulley aassembly, fly wheel and links. These members are connected to each other and difficult to assemble and will result in higher production costs.

SUMMARY OF THE INVENTION

It is therefore an object of the present invention to provide an improved video casstte rewinder, which has a compact construction and can effect an accurate opening of the receptacle for video cassette concurrently with the ending of rewinding of the tape.

According to the present invention, there is provided an improved video cassette rewinder comprising a base, a receptacle, a buffer device and driving device, and a receptacle opening device etc. and characterized in that the driving device is comprised of a single belt pulley provided beneath a rewinding shaft and above a receptacle opening device and a camming device. The belt pulley is provided with a plurality of protrusions on the periphery thereof. The rewinding shaft will not be rotated when the rewinding of the video tape is ended due to the fact that the rewinding shaft is engaged with the reel of the video tape, and the belt pulley will be moved downward by the shifting device, and one of the protrusions will push the receptacle opening device to move laterally and to be opened.

The camming device comprises four ratchet bars equidistantly spaced provided at the outer peripheral edge of the bottom of the rewinding shaft, an orientation sleeve engaged with the belt pulley and provided with four guide slots for snap engagement of the four ratchet teeth, and a compression spring disposed on the bottom of the belt pulley to bias the belt pulley to its original position after the belt pulley has been moved downward.

BRIEF DESCRIPTION OF THE DRAWINGS

The present invention will become more readily apparent from the following description of the preferred embodiment of the present invention taken in conjunction with the accompanying drawing, in which:

As shown in FIG. 1, the rewinder system according to the present invention comprises a base 1, a receptacle 2, a buffer device 3 and a driving device 4, and a recptacle opening device 5 provided on the base 1. Base 1, receptacle 2, buffer device 3 and receptacle opening device 5 are all known, and will not be detailedly described. The buffer device 3 is provided between the base 1 and the receptacle. The driving device 4 comprises a motor 40 on a driving mechanism having a single belt pulley 41 provided above a receptacle opening device 5, having a link 50 and a disengaging element 51, and beneath a rewinding shaft 42 which can be engaged with a reel of the video cassette. The link 50 is pivotably connected to the rewinding shaft 43 at the center portiom thereof. One end of the link 50 is provided with a protrusion 501 (see also FIG. 2), and and the other end is provided with a disengaging element 51 which can be engaged or disengaged with the receptacle 2. The pulley 41 is provided with a plurality of protrusions 411 at the outer peripheral edge thereof, and a camming device 44 at the center portion thereof. The camming device 44 comprises four ratchet teeth 441, each having a sloped edge 444, equidistantly spaced provided at the outer peripheral edge of the bottom 421 (FIG. 2) of the rewinding shaft 42, an orientation sleeve 422 (FIGS. 1B & 2) engaged with the belt pulley 41 and provided with four guide slots 445 for unidirectional snap engagement of the four ratchet teeth 441, and a compression spring 443 (FIG. 2) disposed between the bottom of the belt pulley 41 and the base 1 for biasing the belt pulley 41 to its original position after it has been moved downward.

Figure 1A:
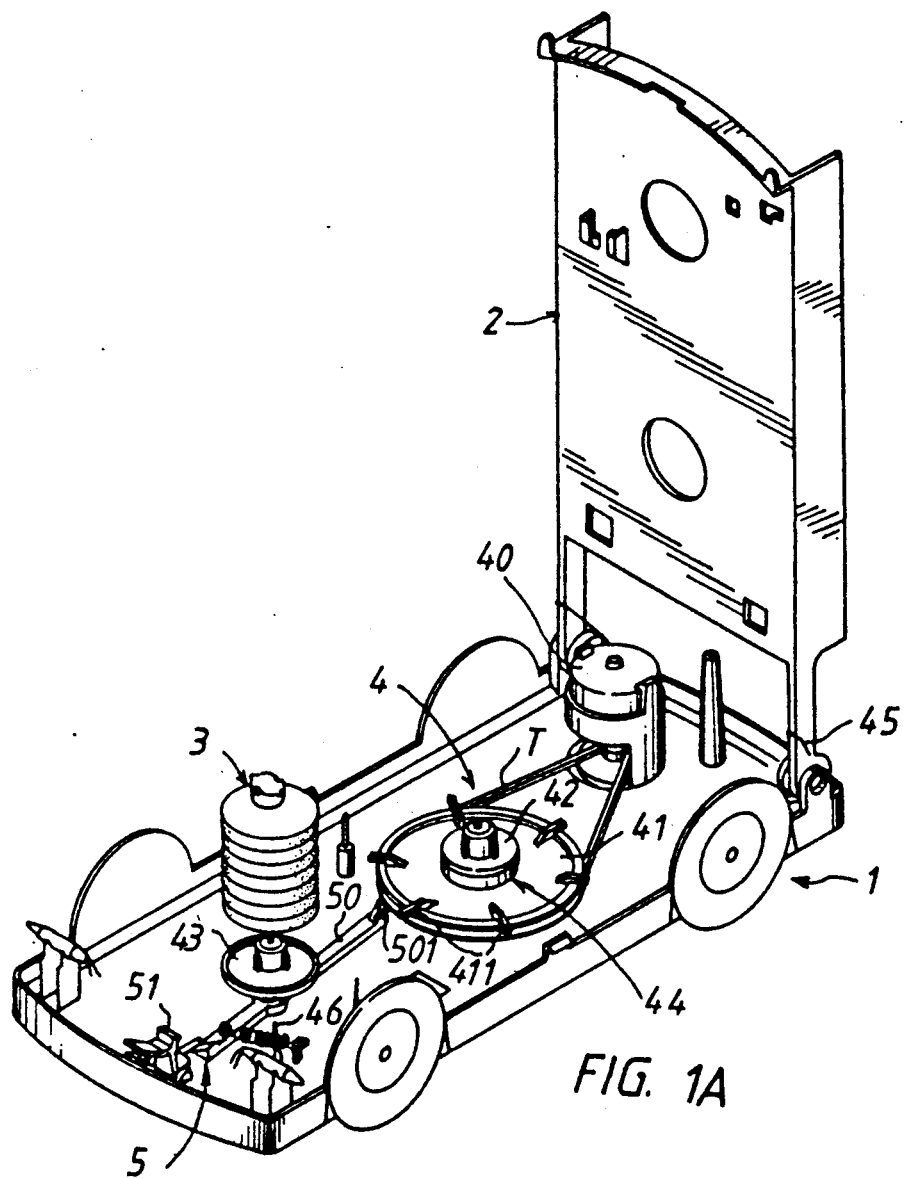
FIG. 1A is a perspective view of the improved rewinder according to the present invention.
Figure 1B:
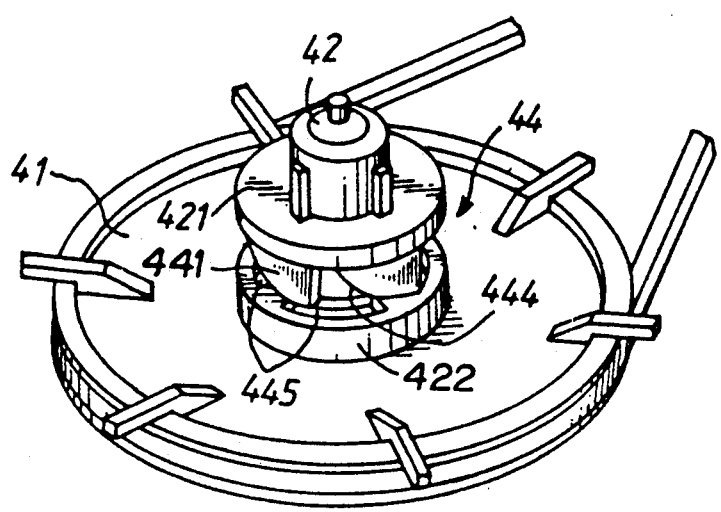
FIG. 1B is an enlarged view of the driving device according to the present invention.
Figure 2:
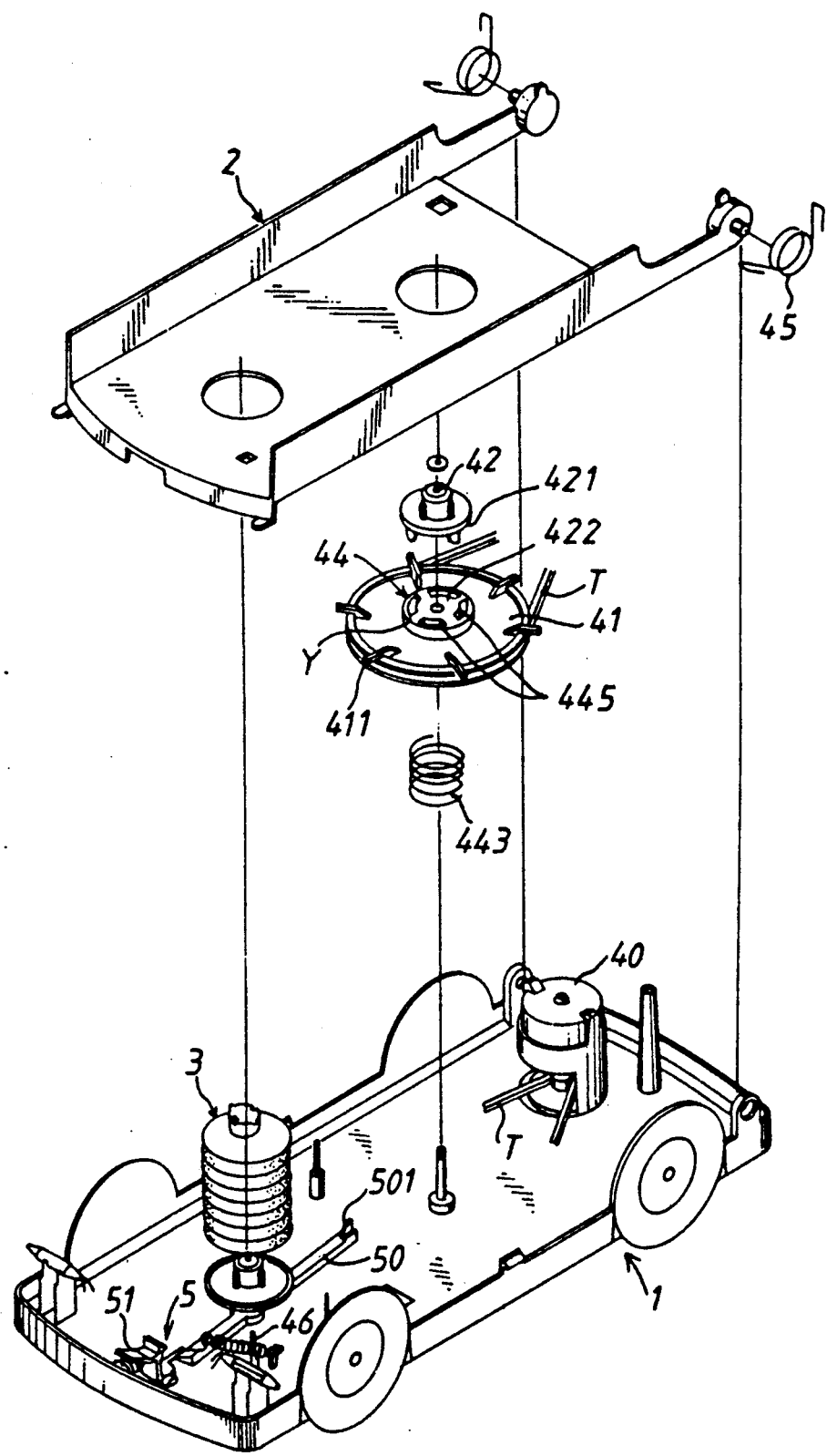
FIG. 2 is an explosive view of the improved rewinder according to the present invention.
Figure 3A:
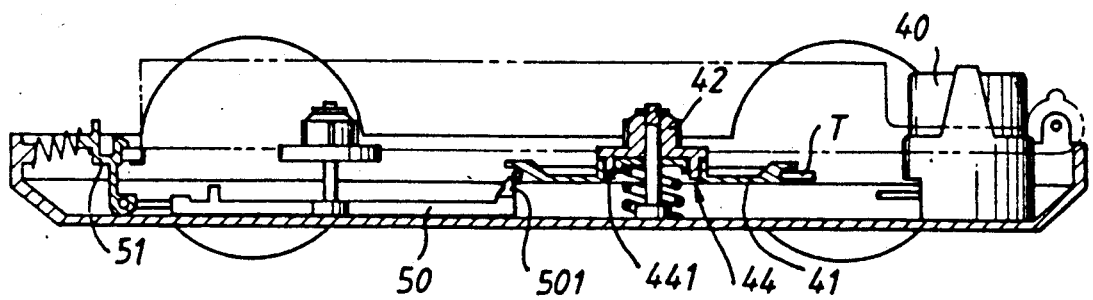
FIGS. 3A, 3B and 3C are views showing the steps of receptacle opening of the improved rewinder according to the present invention.
Figure 3B:
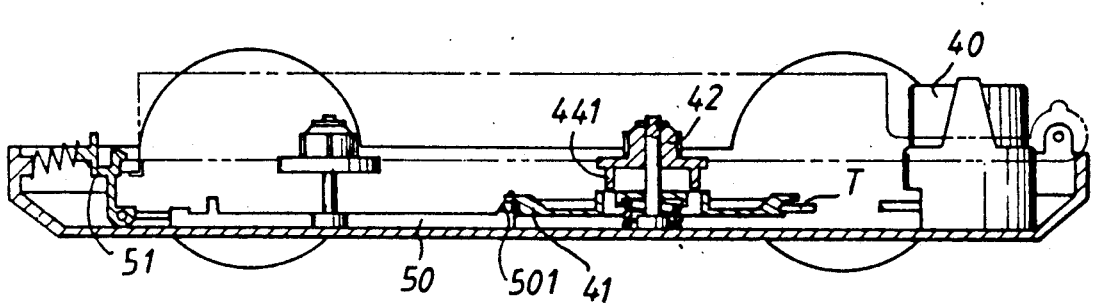
Figure 3C:
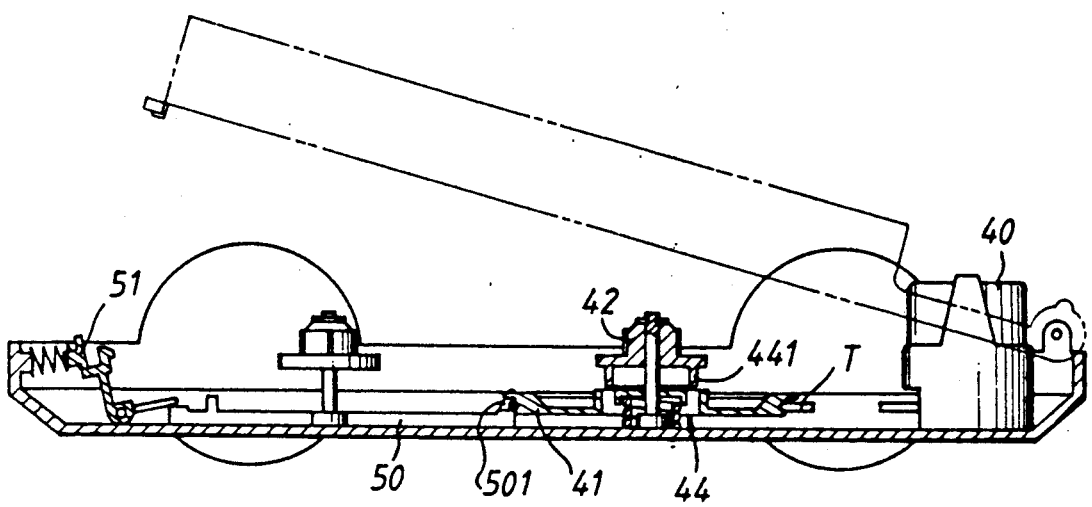

In operation, the belt pulley 41 is rotated through belt T by the motor 40 in order to rotate the rewinding shaft 42 so that the video tape received in the cassette inserted in the receptacle can be re-wound. The rewinding shaft 42 will be stopped as soon as the rewinding of the video tape is ended due to the engagement of the reel of the video tape as shown in FIG. 3A. At this moment, the belt pulley 41 remains rotating by the belt T so that the belt pulley 41 will be slowly moved downward due to an engagement between the four ratchet teeth 441 on the bottom of the rewinding shaft 42 and the four guide slots 445 on the orientation sleeve 422 i.e. the four ratchet teeth 441 resting on the partition walls Y (FIG. 2) of the four guide slots 445 on the orientation sleeve 422, as shown in FIG. 3b. One of the protrusions 411 on the belt pulley 41 will push the protrusion 501 at one end of the link 50 to move laterally when the belt pulley 41 is moved downward to a position in which the ratchet teeth are kept away fron the guide slots, so that the disengagement element 51 at the other end of the link 50 can be moved laterally, the receptacle 2 will be angularily moved and opened upward by means of a torsion spring 45, and the power supply will be cut off by means of a push button 46.

I claim:

1. A driving device for a video cassette rewinder, comprising:
    a base;
    a receptacle provided on said base for receiving a video cassette to be rewound;
    a rewinding shaft rotatably mounted on said base for receiving a reel of tape of a video cassette to be rewound;
    a receptacle opening device provided on said base operative to selectively latch said receptacle in a closed position and released said receptacle for movement to an open position;
    a pulley provided beneath said rewinding shaft, said pulley having at least one protrusion on its periphery for operatively engaging said receptacle opening device;
    a driving means provided on said base and comprising a power supply and driving mechanism for driving said pulley; and
    a camming device coupled between said rewinding shaft and said pulley for driving said rewinding shaft, said pulley and shaft being adjacent one another when said rewinding shaft is free to rotate, and for camming said pulley and shaft away from each other when said rewinding shaft is not free to rotate; whereby:
    said rewinding shaft and said pulley rotate together when the video tape is rewinding and the video cassette reel, and therefore said rewinding shaft, is free to rotate; and
    said camming device separates said pulley and shaft by axial movement of said pulley relative to said shaft when the video tape is rewound and the video cassette reel, and therefore said rewinding shaft, is not free to rotate, such movement causing said at least one protrusion on said pulley to engage said receptacle opening device and effect opening of said receptacle.

2. The driving device as defined in claim 1, wherein said camming device comprises:
    four ratchet teeth equidistantly spaced along the outer peripherial edge of the bottom of said rewinding shaft;
    an orientation sleeve engaged with said pulley and provided with four guide slots for unidirectional snap engagement of said four ratchet teeth; and
    a compression spring disposed on the bottom of said pulley for biasing said pulley to its original position after said pulley has been moved downward by said camming device.

* * * * *